US008443760B2

(12) United States Patent
Bailey

(10) Patent No.: US 8,443,760 B2
(45) Date of Patent: May 21, 2013

(54) CAT FEEDING ENCLOSURE

(76) Inventor: William W. Bailey, Chevy Chase, MD (US)

( * ) Notice: Subject to any disclaimer, the term of this patent is extended or adjusted under 35 U.S.C. 154(b) by 125 days.

(21) Appl. No.: 12/944,349

(22) Filed: Nov. 11, 2010

(65) Prior Publication Data

US 2012/0118240 A1    May 17, 2012

(51) Int. Cl.
*A01K 1/03* (2006.01)
*A01K 31/06* (2006.01)
*A01K 39/01* (2006.01)

(52) U.S. Cl.
USPC .......................................... 119/478; 119/472

(58) Field of Classification Search
USPC ............. 119/168, 59, 63, 422, 452, 472, 473, 119/478, 51.5, 483, 441, 453, 454, 475, 165; 472/62
See application file for complete search history.

(56) References Cited

U.S. PATENT DOCUMENTS

| 2,346,001 | A | | 4/1944 | Bate | |
|---|---|---|---|---|---|
| 2,653,569 | A | | 9/1953 | Forester | |
| 2,822,780 | A | | 2/1958 | Buell | |
| 2,883,192 | A | * | 4/1959 | Royston | 482/36 |
| 2,892,562 | A | | 6/1959 | Smithson | |
| 3,556,058 | A | | 1/1971 | Smiler | |
| 3,885,523 | A | * | 5/1975 | Coleman | 119/165 |
| 4,762,085 | A | | 8/1988 | Ondrasik | |
| 5,092,270 | A | * | 3/1992 | Simons et al. | 119/453 |
| 5,092,277 | A | * | 3/1992 | Baillie et al. | 119/165 |
| 5,361,725 | A | * | 11/1994 | Baillie et al. | 119/165 |
| 5,626,098 | A | | 5/1997 | Askins et al. | |
| 6,032,614 | A | * | 3/2000 | Tominaga | 119/452 |
| 6,267,080 | B1 | * | 7/2001 | Roy | 119/453 |
| 6,883,463 | B2 | | 4/2005 | Link | |
| 6,945,193 | B1 | * | 9/2005 | Tanner et al. | 119/165 |
| D613,910 | S | | 4/2010 | Clemmons et al. | |
| 2008/0156276 | A1 | | 7/2008 | Denenberg et al. | |
| 2009/0223461 | A1 | | 9/2009 | Trunnell et al. | |
| 2012/0210947 | A1 | * | 8/2012 | DiPaolo | 119/472 |

* cited by examiner

*Primary Examiner* — Kristen C Hayes

(57) ABSTRACT

A cat feeding enclosure comprises a plurality of exterior walls enclosing an interior space, an entry opening for a cat to enter the interior space, a feeding area in the interior space for accommodating a receptacle for holding cat food, and an interior wall within the enclosure defining a circuitous path for a cat to walk along from the entry opening to access the feeding area. The entry opening is preferably no larger than necessary to accommodate passage of a large size cat therethrough. The circuitous path has a plurality of sharp turns to prevent a dog from following the circuitous path from the entry opening to the feeding area.

20 Claims, 7 Drawing Sheets

CAT FEEDING ENCLOSURE

BACKGROUND OF THE INVENTION

1. Field of the Invention

The present invention pertains generally to feeding enclosures for cats and, more particularly, to a cat feeding enclosure that allows a cat to freely access food within the feeding enclosure while preventing a dog from accessing the food within the feeding enclosure.

2. Brief Discussion of the Related Art

The ownership of cats and/or dogs has become very popular on a widespread basis. Many people derive great pleasure from animal companionship, and research studies have concluded that the companionship of dogs and/or cats provides many various emotional and physical benefits to humans. A large percentage of households maintain at least one dog and/or one cat. By some estimates, more than 20 percent of households in the United States alone maintain both a dog and a cat. The number of people owning pets, especially dogs and cats, is expected to continue to increase, as is the amount of money that pet owners expend on the health, welfare and enjoyment of their pets. The pet supply industry has thusly become a booming business as the ever increasing number of pet owners seek products that promote the health, welfare and enjoyment of their pets, and of dogs and cats in particular.

It is customary for dogs and cats to eat and drink from food and water dishes or bowls placed on the floor. In homes where both a dog and a cat reside, it is a common problem for the dog to attempt to consume any food that is available in the cat's food dish or bowl. When the dog and cat are fed at or about the same time, it is common for the dog to develop the habit of quickly consuming its own food, and then seeking out the cat's food dish in order to consume any cat food therein. Because cats tend to be picky and finicky eaters who do not quickly consume all of the food provided to them at feeding time, the dog usually finds some cat food in the cat's food dish for the dog to consume, which serves to reinforce the dog's behavior. Even if the cat is fed at a different feeding time from the dog, the dog will still ordinarily habitually seek out the cat's food dish in order to consume the cat food therein. The dog's urge to consume the cat's food is very powerful, since dogs are generally highly attracted to cat food because of its higher fat, protein and caloric content, as well as its smell.

The cat and the dog both suffer because of the above-described problem. Cat food and dog food are specifically formulated to meet the different nutritional needs of the different species, making it undesirable for the dog to consume the cat's food. Dogs that regularly consume cat food may experience kidney ailments, urinary ailments, and/or gastrointestinal ailments such as diarrhea and vomiting. Dogs that consume cat food in addition to their own dog food may become overweight, resulting in the various health problems typically associated with canine overweight and obesity. Dogs that eat their own food quickly in a rush to seek out the cat's food may experience bloat, which can be a potentially life-threatening condition. Some cat foods contain prescription ingredients that may be particularly undesirable for consumption by dogs.

On the other hand, the cat that has its food consumed by the dog may be deprived of a sufficient quantity of food and may experience nutritional deficiencies and/or weight loss. When the cat's food contains prescription ingredients, the cat will also be deprived of the prescription ingredients. The dog's consumption of the cat's food may prevent the cat from following its natural preference to "graze," or to eat small quantities of food at will frequently throughout the day, despite the owner providing enough food in the cat's dish at feeding time to be available to the cat for at least a significant portion of the day.

Pet owners who maintain dogs and cats in the same household are often negatively affected by the problem of dogs eating or attempting to eat the cat's food. The pet owner is often left not knowing whether the dog and the cat are consuming the correct food and the appropriate amount of food. This uncertainty can create stress for the many pet owners who are concerned about the health and nutrition of their pets. When the problem results in health issues for the dog and/or the cat, the owner must usually bear financial and logistical responsibility for the animal's veterinary or medical treatment. Where the pet owner addresses the problem by replenishing the cat's food dish with additional food to compensate for that eaten by the dog, there may be an appreciable financial impact as cat food, especially prescription cat food, can be quite expensive.

Currently, a limited number of disadvantageous approaches are available to pet owners to deal with the problem of a dog eating or attempting to eat a cat's food. The problem can simply be ignored, or it can be addressed by providing the cat with additional food to compensate for what the dog has eaten. As pointed out above, each of these approaches potentially holds significant negative consequences for the cat, the dog and the pet owner. Another approach involves placing the cat's food dish in a location inaccessible to the dog, most typically upon an elevated surface such as a table or counter. This approach, too, is disadvantageous and/or may be ineffective. Many pet owners prefer to train their cat not to walk upon surfaces such as tables and counters. In addition, not all cats are naturally inclined toward jumping, and older and/or physically infirm cats may deliberately avoid jumping due to their physical condition, resulting in the cat avoiding the elevated surface and failing to eat a sufficient quantity of food. Furthermore, it is possible for many larger dogs to reach a cat food dish placed upon a standard height table or counter surface. The most effective approach to the problem involves isolating the dog and cat from one another by confining them to separate living areas using physical barriers. Most typically, the dog and cat will be kept in separate rooms, with access between the rooms prevented by closing a door between the rooms or by a conventional pet or baby gate mounted in a doorway between the rooms. The presence and use of conventional gates can be a nuisance to people residing in the household and, in addition, such gates can be a safety hazard due to people straddling over closed gates in order to avoid having to open and close them according to their intended operation. Moreover, it is possible for larger size dogs and/or dogs that are good jumpers to scale the gates and gain access to the cat's living area. Another drawback to isolating the cat and dog from one another is that the cat and dog are deprived of the opportunity for frequent interaction with each other that may be essential for the development of mutual acceptance, such that the cat and dog may not get along with one another on occasions when they are allowed to comingle. A lack of harmony between a dog and a cat within a household can create unpleasantness for the animals as well as the human residents of the household and stands in contrast to the enjoyment that the animals and humans alike experience when the dog and the cat cohabitate in harmony.

It is seen from the above that the need exists for a device that would prevent a dog from gaining access to a cat's food dish while allowing the cat to freely access the food dish on demand, without requiring that the cat food dish be placed on an elevated surface and without requiring forced confinement of the dog and cat to separate living areas.

SUMMARY OF THE INVENTION

A cat feeding enclosure comprises a plurality of exterior walls enclosing an interior space in an assembled condition for the enclosure, an entry opening for a cat to enter the interior space, a feeding area in the interior space for accommodating a receptacle for holding cat food, and an interior wall within the enclosure defining a circuitous path for the cat to walk along from the entry opening to the feeding area to access the food within the receptacle. The entry opening is preferably no larger than necessary to accommodate passage therethrough of a large size cat, such that the entry opening will be too small for a majority of dogs to enter the enclosure. In addition, the circuitous path has a plurality of sharp turns to prevent or deter a dog, even one small enough to fit through the entry opening, from following the circuitous path from the entry opening to the feeding area.

The exterior walls of the enclosure include a horizontal bottom wall to support a cat for walking along the bottom wall, a top wall, and a front wall, a rear wall, and opposite side walls connecting the top and bottom walls. The entry opening is preferably provided in the enclosure along the front wall and adjacent or toward one of the side walls. The entry opening has a width in the horizontal direction between the side walls and a height in the vertical direction between the top and bottom walls. The interior wall is spaced rearwardly from the front wall and is aligned or in line with the entry opening in the front to rear direction. The feeding area is defined between the interior wall and the rear wall. Preferably, the interior wall has a width that extends in the same direction as the width of the entry opening but extends beyond the width of the entry opening in the direction of the side wall that is opposite the one side wall. The sharp turns defined by the circuitous path are preferably in a plurality of different directions from the entry opening to the feeding area. In one embodiment, the circuitous path includes a first sharp or right angle turn from the entry opening toward the side wall that is opposite the one side wall, a second sharp or right angle turn toward the rear of the enclosure, and a third sharp or right angle turn toward the one side wall of the enclosure. The enclosure preferably includes a floor pan disposed over the bottom wall and providing a walking surface for a cat to walk along the bottom wall. Preferably, the enclosure includes a feeding tray disposed in the feeding area for holding a food receptacle and a water receptacle. The enclosure includes an access door on one of the exterior walls movable from a closed position to an open position to provide an access opening into the interior space for removal and replacement of the food and water receptacles. A latch is provided on the enclosure for releasably securing the access door in the closed position. The enclosure may have a carrying handle for manually transporting the enclosure. The enclosure may be collapsible from the assembled condition to a collapsed condition in which the interior wall and the front, rear, top and opposite side walls lay in close overlapping arrangement upon the bottom wall.

The enclosure may include a bottom comprising the horizontal bottom wall and a vertical peripheral wall extending along the periphery of the bottom wall. The bottom wall and peripheral wall form a depression for receiving the floor pan with a close fit. The feeding tray may include locking elements for releasably securing the feeding tray to the floor pan. The interior wall and the front, rear, top and opposite side walls may be pivotal to allow the enclosure to assume the collapsed condition and to be returned to the assembled condition. The front, rear and opposite side walls may have lower edges respectively pivotally attached to an upper edge of the peripheral wall. The interior wall may have a side edge pivotally attached to the one side wall. The top wall may have opposite side edges respectively pivotally attached to the opposite side walls. The pivotal attachments may comprise a plurality of pivotal connectors. The enclosure may also include a plurality of clips for releasably securing the pivotal walls in the assembled condition.

Various objects, advantages and benefits of the invention will become apparent from the following detailed description of the invention taken in conjunction with the accompanying drawings.

DETAILED DESCRIPTION OF THE INVENTION

Figure 1:
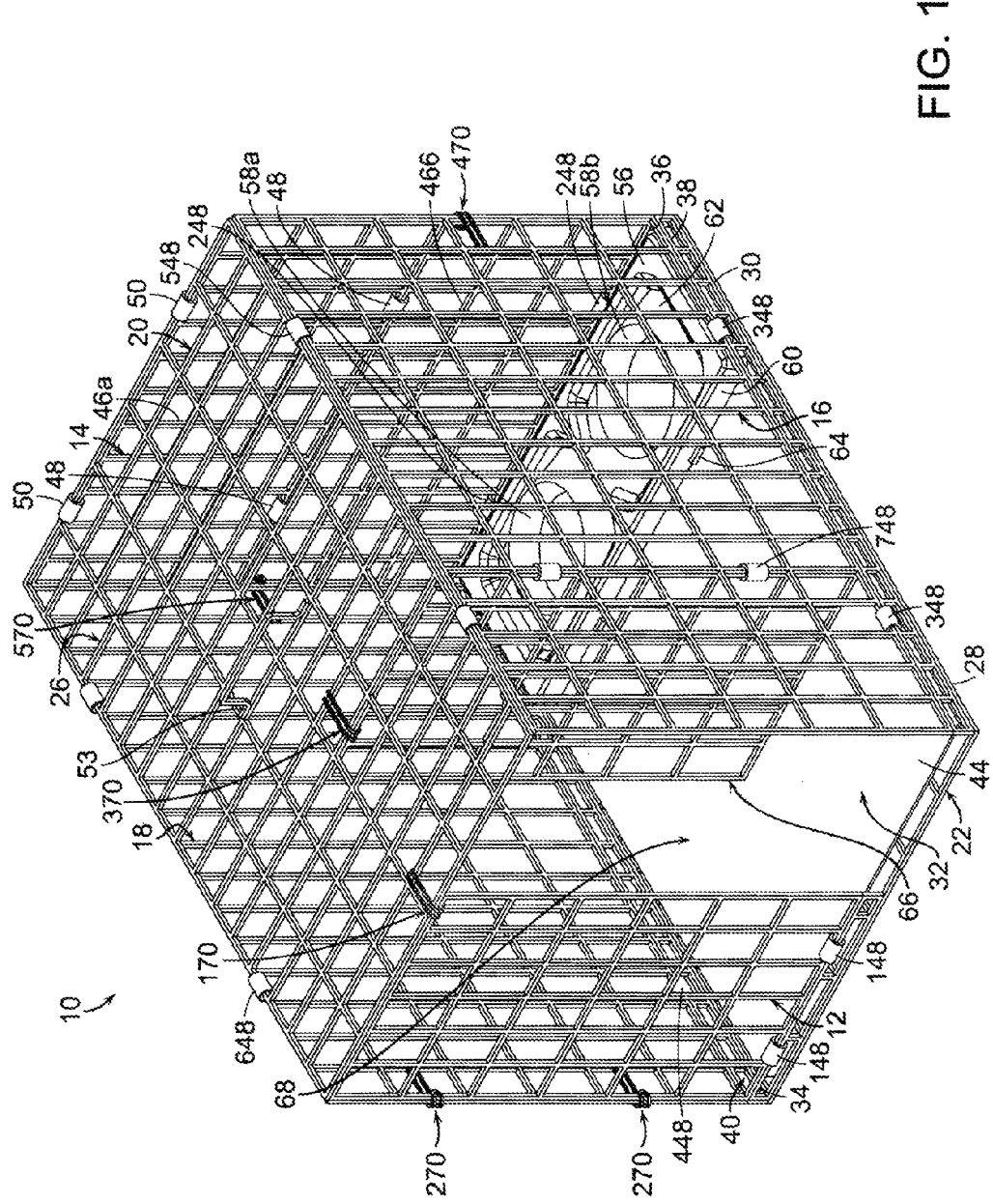
FIG. 1 is a perspective view of the cat feeding enclosure.

The cat feeding enclosure 10, as illustrated in FIGS. 1-7 in an assembled or operative condition, comprises a front wall 12, a rear wall 14, a right side wall 16, a left side wall 18, a top wall 20 and a bottom 22 assembled or arranged to define a rectangular prism or right-angle parallelepiped external configuration enclosing an interior space. The front wall 12, rear wall 14, right side wall 16, left side wall 18, top wall 20 and bottom 22 form exterior walls of the enclosure 10 and are made of flat or planar panels, sections or sheets of wire mesh material 26 having a grid pattern of perpendicularly crisscrossing parallel horizontal wires and parallel vertical wires of appropriate gauge and strength. It should be appreciated, however, that the front wall 12, rear wall 14, right side wall 16, left side wall 18, top wall 20, and bottom 22 can be made of other materials. For example, the enclosure 10 can be fabricated from panels, sections or sheets of transparent or non-transparent solid material, such as plastic, preferably with holes therein for ventilation. It should also be appreciated that the enclosure 10 can have various alternative configurations with planar or non-planar walls. The enclosure 10 is an example of one in which the front and rear walls 12 and 14 are shorter in length than the right and left walls 16 and 18. It should be appreciated, however, that the enclosure 10 can be designed so that the front and rear walls 12 and 14 are longer than or are equal in length to the right and left walls 16 and 18.

The bottom 22 includes a flat or planar horizontal bottom wall or floor 28 having a rectangular peripheral configuration, and a vertical peripheral wall or border 30 extending along the entire periphery of the bottom wall 28 except for a gap in the peripheral wall 30 corresponding to the width and location for an entry opening 32 into the enclosure 10 as explained further below. The peripheral wall 30 includes a flat or planar front peripheral wall or border segment 34, a flat or planar rear peripheral wall or border segment 36, a flat or planar right peripheral wall or border segment 38 and a flat or planar left peripheral wall or border segment 40 extending, respectively, along the front, rear, right and left peripheral edges of the bottom wall 28. The rear peripheral wall segment 36, the right peripheral wall segment 38 and the left peripheral wall segment 40 extend along the entire length of the respective rear, right and left peripheral edges of the bottom wall 28. The rear peripheral wall segment 36 meets the right peripheral wall segment 38 at a right angle to form a right rear corner of the bottom 22. The rear peripheral wall segment 36 meets the left peripheral wall segment 40 at a right angle to form a left rear corner of the bottom 22. A front edge of the right peripheral wall segment 38 meets the front peripheral edge of the bottom wall 28 at the right front corner of the bottom wall 28. The front peripheral wall segment 34 meets the left peripheral wall segment 40 at a right angle to form a left front corner of bottom 22. The front peripheral wall segment 34 extends along the front peripheral edge of the bottom wall 28 from the left peripheral wall segment 40 to a right edge of the front peripheral wall segment 34 that is spaced from the front edge of the right peripheral wall segment 38 by the width of the entry opening 32. In the enclosure 10, the right edge of the front peripheral wall segment 34 and the front edge of the right peripheral wall segment 38 are each formed by a vertical wire of the wire mesh material 26. The front peripheral wall segment 34 and the rear peripheral wall segment 36 are parallel to one another and are perpendicular to the bottom wall 28. The right peripheral wall segment 38 and the left peripheral wall segment 40 are parallel to one another and are perpendicular to the front and rear peripheral wall segments 34 and 36 and to the bottom wall 28. Each of the front peripheral wall segment 34, the rear peripheral wall segment 36, the right peripheral wall segment 38 and the left peripheral wall segment 40 has an upper edge in parallel with the respective front, rear, right and left peripheral edges of the bottom wall 28. In the case of enclosure 10, the upper edges of the front, rear, right and left peripheral wall segments 34, 36, 38 and 40 are each formed by a horizontal wire of the wire mesh material 26, the upper edges of the front and rear peripheral wall segments 34 and 36 extending from left to right (or right to left) and the upper edges of the right and left peripheral wall segments 38 and 40 extending from front to rear (or rear to front). The upper edges of the peripheral wall segments 34, 36, 38 and 40 form the upper edge of the peripheral wall 30. The bottom wall 28 and peripheral wall 30 define a shallow depression or recess in bottom 22 for receiving a floor pan 44 as explained further below. It should be appreciated that the peripheral wall 30 need not have a gap therein corresponding to the location and width of the entry opening 32, such that the upper edge of the peripheral wall 30 can extend continuously and entirely along the periphery of the bottom wall 28 in parallel therewith. By making the peripheral wall 30 of minimal height, a cat entering the enclosure 10 through the entry opening 32 can easily step over the peripheral wall 30 where it extends across the width of the entry opening. In the case of enclosure 10, the front peripheral wall segment 34 could thusly extend from the left peripheral wall segment 40 to meet the right peripheral wall segment 38 at a right angle and form the right front corner of the bottom 20.

The front wall 12 and the rear wall 14 are flat or planar and are parallel to one another in the assembled condition for the enclosure 10. The front and rear walls 12 and 14 have lower edges respectively contiguous with and attached to the upper edges of the front and rear peripheral wall segments 34 and 36 of bottom 22. The front wall 12 and the rear wall 14 have upper edges respectively contiguous with front and rear peripheral edges of top wall 20 in the assembled condition for the enclosure 10. In the assembled condition for the enclosure 10, the front wall 12 is co-planar or substantially co-planar with the front peripheral wall segment 34, and the rear wall 14 is co-planar or substantially co-planar with the rear peripheral wall segment 36. The right side wall 16 and the left side wall 18 are flat or planar and are parallel to one another as well as being perpendicular to the front and rear walls 12 and 14 in the assembled condition for the enclosure 10. The right and left side walls 16 and 18 have lower edges respectively contiguous with and attached to the upper edges of the right and left peripheral wall segments 38 and 40 of bottom 22. The right and left side walls 16 and 18 have upper edges respectively contiguous with right and left peripheral edges of top wall 20 in the assembled condition for the enclosure 10. In the assembled condition for the enclosure 10, the right side wall 16 is co-planar or substantially co-planar with the right peripheral wall segment 38, and the left side wall 18 is co-planar or substantially co-planar with the left peripheral wall segment 40. The top wall 20, which is similar to bottom wall 28, is flat or planar and is parallel to the bottom wall 28. The top and bottom walls 20 and 28 are perpendicular to the front and rear walls 12 and 14 and to the right and left side walls 16 and 18 in the assembled condition for the enclosure 10. Edges that are described herein as being "contiguous" or in "contiguous relation" may be formed by pairs of wires of the wire mesh material 26 that are touching, nearly touching, adjacent or close to one another in parallel or side by side relation. The front wall 12, the rear wall 14, the right and left side walls 16 and 18, and the peripheral wall 30 may be considered vertical walls of the enclosure while the top and bottom walls 20 and 28 may be considered horizontal walls. It should be appreciated that the vertical walls do not have to be perpendicular or at a right angle to the horizontal walls of the enclosure.

The front wall 12, the rear wall 14, the right side wall 16 and the left side wall 18 for the enclosure 10 are the same length or substantially the same length, respectively, as the front peripheral wall segment 34, the rear peripheral wall segment 36, the right peripheral wall segment 38 and the left peripheral wall segment 40 of bottom 22. The upper and lower edges of the front wall 12, the rear wall 14, the right side wall 16 and the left side wall 18, and the front, rear, right and left peripheral edges of top wall 20, are each formed by a horizontal wire of the wire mesh material 26, the upper and lower edges of the front and rear walls 12 and 14 extending from left to right (or right to left) and the upper and lower edges of the right and left side walls 16 and 18 extending from front to rear (or rear to front). Vertical wires of the wire mesh material 26 respectively form left and right edges of the front wall 12, left and right edges of the rear wall 14, front and rear edges of the right side wall 16, and front and rear edges of the left side wall 18.

Figure 2:
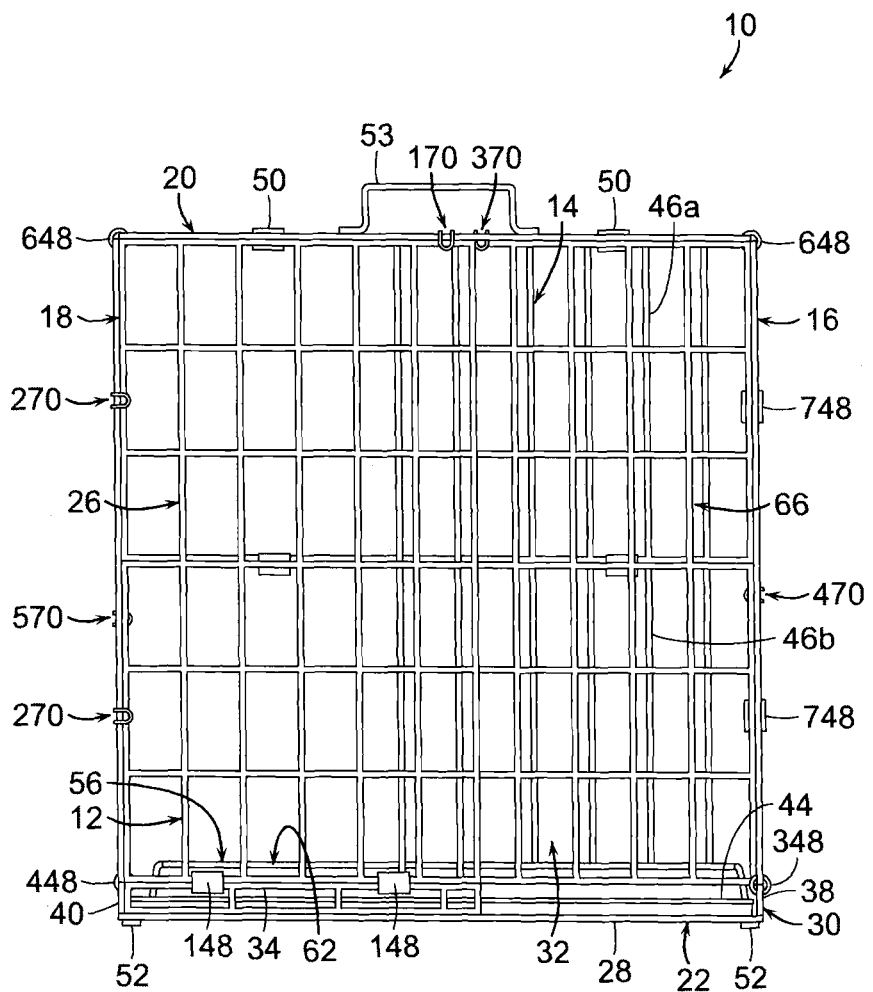
FIG. 2 is a front view of the cat feeding enclosure.
Figure 3:
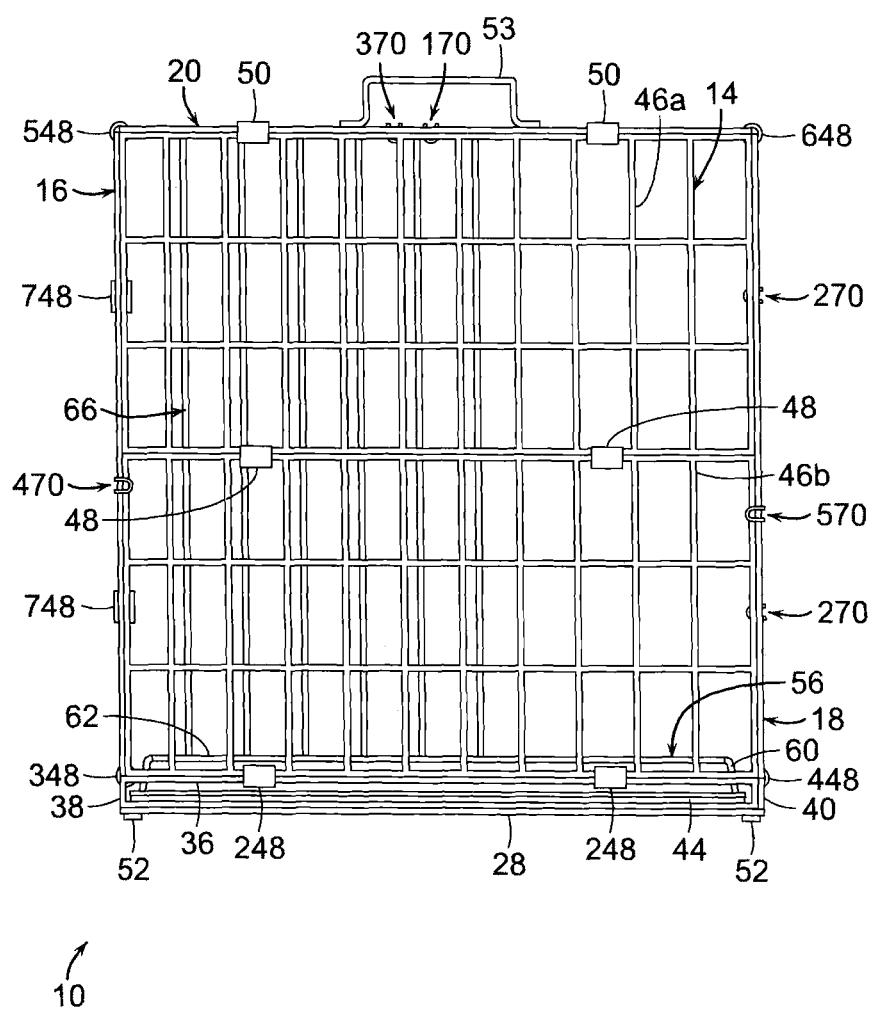
FIG. 3 is a rear view of the cat feeding enclosure.
Figure 4:
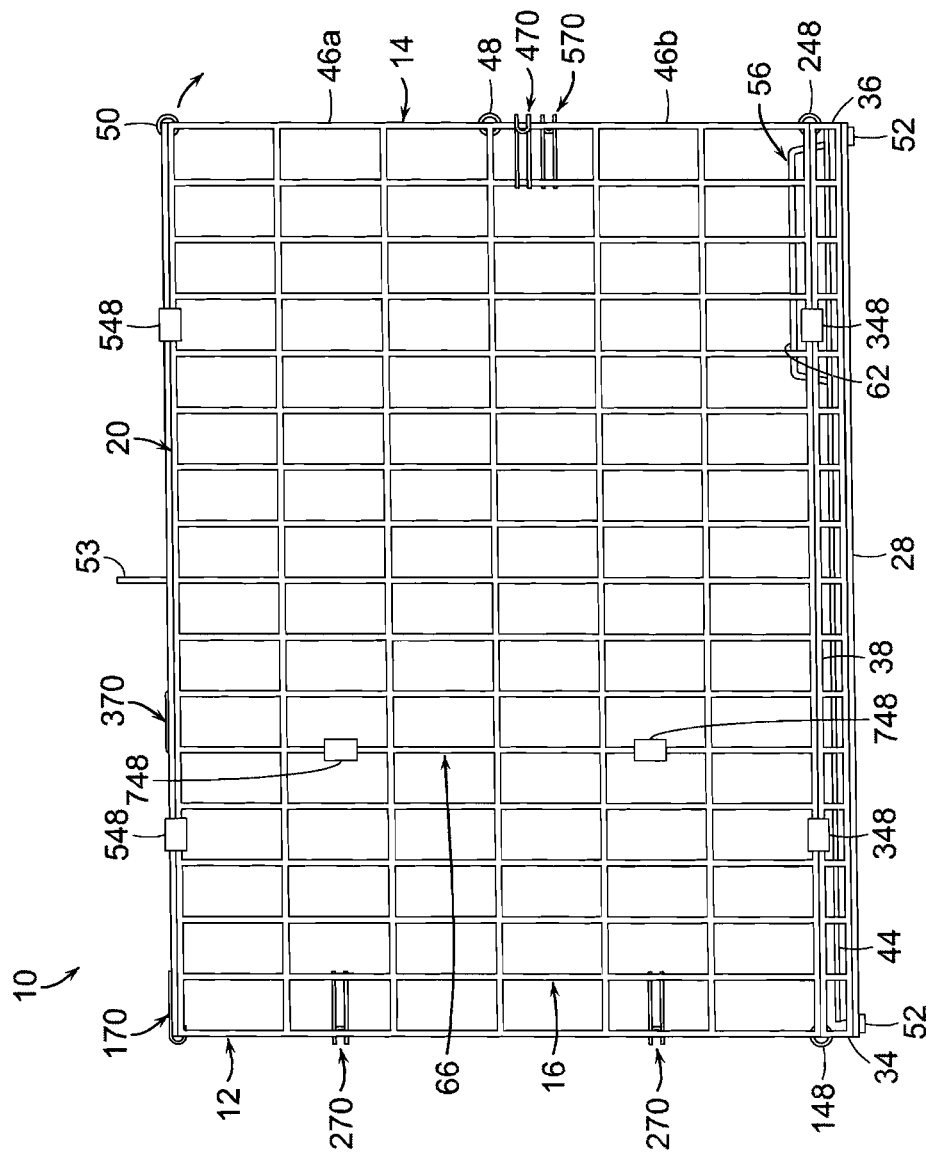
FIG. 4 is a right side view of the cat feeding enclosure.

In the assembled condition for enclosure 10, the left edge of front wall 12 is contiguous with the front edge of left side wall 18 to form a right angle between the front wall 12 and the left side wall 18 at the left front corner formed by the front peripheral wall segment 34 and the left peripheral wall segment 40 of bottom 22. The right edge of the front wall 12 is aligned with the right edge of the front peripheral wall segment 34 of bottom 22. The left edge of rear wall 14 is contiguous with the rear edge of left side wall 18 to define a right angle between the rear wall 14 and the left side wall 18 at the left rear corner where the rear peripheral wall segment 36 meets the left peripheral wall segment 40 of bottom 22. The right edge of rear wall 14 is contiguous with the rear edge of right side wall 16 to define a right angle between the rear wall 14 and the right side wall 16 at the right rear corner where the rear peripheral wall segment 36 meets the right peripheral wall segment 38 of bottom 22. The front edge of the right side wall 16 is aligned with the front edge of the right peripheral wall segment 38 at the right front corner where the right peripheral wall segment 38 meets the front peripheral edge of the bottom wall 28. The entry opening 32 has a width in the horizontal direction between the right edges of front wall 12 and front peripheral wall segment 34 and the front edges of right side wall 16 and right peripheral wall segment 38. The entry opening 32 has a height in the vertical direction between the floor pan 44 and the top wall 20 as best seen in FIG. 2. The width of the entry opening 32 is preferably no larger than necessary to comfortably accommodate the girth of a large size cat. The height of the entry opening is preferably no larger than necessary to comfortably accommodate the standing height of a large size cat. In one embodiment, the entry opening 32 is 9 inches wide and 18 inches high. Preferably, the width of the entry opening is in the range of 9 to 10 inches and the height of the entry opening is in the range of 12 to 18 inches. Making the size of the entry opening 32 no larger than necessary for a large cat to fit therethrough will prevent the majority of dogs, including dogs of average size and larger, from passing through the entry opening.

It should be appreciated that in the case where the front peripheral wall segment 34 extends across the width of the entry opening 32, the height of the entry opening corresponds to the distance between the upper edge of the front peripheral wall segment and the top wall 20. Although the entry opening 32 is depicted as having its left side defined by the right edge of front wall 12, its right side defined by the front edge of right side wall 16, and its top defined by the front peripheral edge of top wall 20, it should be appreciated that the top and/or both the left and right sides of the entry opening can be defined by inner edges of the front wall 12. As an example, the front wall 12 can extend from the left side wall 18 all the way to the right side wall 16, and the entry opening 32 can be disposed entirely within the front wall near the location where the right edge of the front wall meets the front edge of the right side wall. Accordingly, the left and right sides of the entry opening 32 will be defined, respectively, by inner left and right edges of the front wall 12, and each of the inner left and right edges can be a vertical wire of the wire mesh material 26 of the front wall. The top of the entry opening 32 will be defined by an inner upper edge of the front wall, and the inner upper edge of the front wall can be a horizontal wire of the wire mesh material 26 of the front wall.

The rear wall 14 may comprise an upper rear wall segment 46a pivotally connected to a lower rear wall segment 46b for movement from a closed position, wherein the upper and lower rear wall segments 46a and 46b are co-planar or substantially co-planar as seen in FIGS. 1-7, to an open position wherein the upper rear wall segment 46a is pivoted relative to the lower rear wall segment 46b to provide an access opening into the interior of the enclosure 10. The upper rear wall segment 46a has an upper edge forming the upper edge of the rear wall 14 and has a bottom edge pivotally attached to a top edge of the lower rear wall segment 46b in contiguous relation. The upper edge of the upper rear wall segment 46a is contiguous with the rear edge of top wall 20 in the closed position for the rear wall 14. The lower rear wall segment 46b has a lower edge that forms the lower edge of the rear wall 14 that is attached to the upper edge of the rear peripheral wall segment 36 of bottom 22. The bottom edge of the upper rear wall segment 46a and the top edge of the lower rear wall segment 46b are each formed by a horizontal wire of the wire mesh material 26. Left edges of the upper and lower rear wall segments 46a and 46b are respectively formed by vertical wires of the wire mesh material 26 that align or substantially align to form the left edge of the rear wall 14 in the closed position. Right edges of the upper and lower rear wall segments 46a and 46b are respectively formed by vertical wires of the wire mesh material 26 that align or substantially align to form the right edge of the rear wall 14 in the closed position. As explained further below, the pivotal attachment between the upper and lower rear wall segments 46a and 46b allows the upper rear wall segment 46a to serve as an access door selectively pivotal, as shown by the arrow in FIG. 4, from the closed position outwardly about a horizontal pivot axis at its bottom edge to obtain the open position and provide an access opening into the interior space. It should be appreciated that the rear wall 14 could be designed in various alternative ways for movement between closed and open positions. For example, the lower rear wall segment 46b can be designed to pivot relative to the upper rear wall segment; the rear wall can be designed as a single panel and the entire rear wall panel can pivot; the rear wall can be designed with a pivotal hatch or door having a periphery spaced inwardly from the periphery of the rear wall panel; and the pivot axis can be horizontal or vertical and/or disposed at various locations.

The bottom edge of the upper rear wall segment 46a is pivotally attached to the top edge of the lower rear wall segment 46b via one or more pivotal connectors 48. In the enclosure 10, two pivotal connectors 48 are provided to attach the bottom edge of the upper rear wall segment 46a to the top edge of the lower rear wall segment 46b in contiguous relation. Various types of pivotal or hinged connectors can be used in the enclosure 10, the pivotal connectors 48 being but one example of a suitable type of pivotal connector. Each pivotal connector 48 comprises an elongate, tubular sleeve having a longitudinal axial passage therethrough and a longitudinal slot through the sleeve wall in communication with the axial passage. The horizontal wire that forms the bottom edge of the upper rear wall segment 46a and the horizontal wire that forms the top edge of the lower rear wall segment 46b are inserted through the slots and received together in the axial passages of the sleeves, which hold the two wires together in contiguous relation within the axial passages of the sleeves while providing sufficient freedom of movement for the upper rear wall segment 46a to be rotated or pivoted about a horizontal pivot axis extending through the axial passages of the sleeves. The pivotal connectors 48 are appropriately spaced or located along the bottom edge of upper rear wall segment 46a/top edge of lower rear wall segment 46b to provide smooth and balanced rotation of the upper rear wall segment 46a between the closed and open positions. The pivotal connectors 48 allow the upper rear wall segment 46a to be rotated about the pivot axis relative to the lower rear wall segment 46b up to 180° from the closed position such that the upper rear wall segment 46a can lie flat or substantially flat in overlapping arrangement with the lower rear wall segment 46b in the open position. The pivotal connectors 48 could be designed as removable connectors that can be "snapped" on and off of the wires, or the pivotal connectors 48 could be designed to be in effect non-removable or permanently attached connectors. The tubular sleeves of the connectors 48 may be resilient, flexible or deformable with shape memory, allowing the slots to expand as needed for the wires to be inserted therethrough and into the axial passages of the sleeves, and to thereafter contract to hold the wires together in contiguous relation within the axial passages of the sleeves. The enclosure 10 can be supplied to a purchaser with the connectors 48 already installed thereon to reduce the amount of assembly required of the purchaser or user. When the upper rear wall segment 46a is pivoted to obtain the open position, the access opening that is provided into the interior space of the enclosure 10 is equivalent to the space vacated by the upper rear wall segment 46a.

A suitable latch is provided on the enclosure 10 for releasably securing the rear wall 14 in the closed position wherein the upper edge of the upper rear wall segment 46a is contiguous with the rear edge of top wall 20, and the upper and lower rear wall segments 46*a* and 46*b* are in co-planar or substantially co-planar alignment to form an essentially continuous flat or planar panel. The latch for enclosure 10 comprises a plurality of latch elements 50 for releasably securing the upper edge of the upper rear wall segment 46*a* to the rear edge of the top wall 20. Each latch element 50, two of which are provided in enclosure 10 at appropriately spaced locations between the right and left side walls 16 and 18, comprises a clip having a C-shaped configuration in cross-section defining a cavity and a slot communicating with the cavity. The latch elements 50 may be resilient, flexible or deformable with shape memory to allow the clips to expand as needed for the horizontal wire that forms the upper edge of upper rear wall segment 46*a* and/or the horizontal wire that forms the rear edge of top wall 20 to be inserted through the slots and received within the cavities, and to thereafter contract to hold the wires in contiguous relation within the cavities, while allowing the upper edge of the upper rear wall segment 46*a* to be selectively detached from the rear edge of the top wall 20 with minimal manual force so that the upper rear wall segment 46*a* can be pivoted outwardly and downwardly toward the lower rear wall segment 46*b* in the direction of the arrow shown in FIG. 4 to obtain the open position. The enclosure 10 can be supplied to a purchaser with the latch elements 50 permanently attached to either the rear edge of the top wall 20 or the upper edge of the upper rear wall segment 46*a* at appropriately spaced locations. It should be appreciated that the latch provided in the enclosure 10 for releasably securing the rear wall 14 in the closed position could include one or more of various different types of latch elements mounted at various locations.

A plurality of spacers or feet 52 are attached to a lower surface of the bottom wall 28 for supporting the enclosure 10 in spaced relation upon horizontal surfaces such as the floors typically found within residential and other types of buildings. The configuration and material for the spacers 52 may be selected to stabilize the enclosure 10 and prevent it from sliding on conventional floor surfaces as well as to prevent damage to the floor surfaces. The spacers 52 may be made of rubber or similar materials. The number of spacers 52 attached to the lower surface of bottom wall 28 can vary. In one embodiment, four spacers 52 are provided located at the respective four corners of the bottom wall 28. A carrying handle 53 is preferably provided on the top wall 20 of the enclosure 10 for being gripped by the hand to facilitate carrying and transporting the enclosure 10. The carrying handle 53 may be pivotal so that it can lie flat or substantially flat against the top wall 20 when not in use.

The floor pan 44 preferably has a peripheral configuration to fit within the depression of bottom 22 with a close fit, the floor pan 44 having a rectangular peripheral configuration corresponding to the rectangular configuration of the bottom wall 28. The floor pan 44 has a flat or planar top surface disposed below the upper edge of the peripheral wall 30 and that provides a stable horizontal surface upon which a cat can walk, stand and sit along the bottom wall 28 within the enclosure 10. It should be appreciated, however, that the top surface of the floor pan can be disposed above the upper edge of the peripheral wall 30. A feeding tray 56 is removably mounted on the floor pan 44 at the rear of the enclosure 10. The feeding tray 56 for enclosure 10 is oriented with the back of the tray disposed adjacent, close to or in abutment with the rear peripheral wall segment 36 of the bottom 22, and with the length of the tray fitting between the right and left peripheral wall segments 38 and 40 of the bottom 22 with a close fit. The feeding tray 56 extends forwardly within the interior of the enclosure 10 a sufficient distance from the rear peripheral wall segment 36 for appropriately sized water and food receptacles or bowls 58*a* and 58*b* to be accommodated within respective recesses or holes of the feeding tray. Feeding tray 56 has a base 60 supporting a platform 62 in a raised or elevated position above the top surface of the floor pan 44. Flexible locking tabs 64 may be provided on the base 60 at the front of the feeding tray 56 for releasable locking engagement with corresponding apertures in the floor pan 44 to releasably secure the feeding tray on the floor pan 44. The platform 62 has two recesses or holes therein for respectively receiving the receptacles or bowls 58*a* and 58*b*, which have circular rims for being supported on the platform 62 when the bowls 58*a* and 58*b* are disposed within the respective recesses or holes in the platform 62. It should be appreciated that the height of the base 60 is selected to accommodate the depth of the bowls 58*a* and 58*b* within the feeding tray 56 when the rims of the bowls are resting upon the platform 62. A user of the cat feeding enclosure 10 will supply the bowls 58*a* and 58*b* with water and food, respectively, for a cat, and the bowls 58*a* and 58*b* can be inserted in and removed from the feeding tray 56 and the enclosure 10 via the access opening that is provided when the upper rear wall segment 46*a* is pivoted to the open position. Also, the feeding tray 56 and floor pan 44 can be inserted in and removed from the enclosure 10 through this access opening. The floor pan 44 and feeding tray 56 can be made of any suitable materials. Preferably, the floor pan 44 and feeding tray 56 are made from molded plastic that is sturdy, but lightweight, and easily cleanable. The receptacles or bowls 58*a* and 58*b* can be made of metal or any suitable material. The enclosure 10 is an example of one in which the feeding tray 56 is oriented in the enclosure so that the bowls 58*a* and 58*b* are disposed side-by-side along the rear peripheral wall segment 36. It should be understood that the feeding tray 56 can be oriented in the enclosure 10 in various alternative ways. As an example, the back of the feeding tray 56 can be disposed adjacent, close to or in abutment with the right peripheral wall segment 38, and with the length of the tray fitting between the rear peripheral wall segment 36 and interior wall 66 with a close fit such that the bowls 58*a* and 58*b* are disposed side-by-side along the right peripheral wall segment 38. It should be appreciated, however, that the cat feeding enclosure 10 can be supplied to a purchaser or end user without the floor pan, feeding tray and/or water and food receptacles.

The cat feeding enclosure 10 includes an interior wall or partition 66 within the interior space to create a circuitous path 68 within the enclosure 10 leading from the entry opening 32 to the bowls 58*a* and 58*b*. The interior wall 66 is in alignment or in line with the entry opening 32 in the front to rear direction perpendicular to the front and rear walls 12 and 14 of the enclosure, but is spaced rearwardly or inwardly from the entry opening 32. The interior wall 66, which is made of the same material 26 as the front wall 12, rear wall 14, right side wall 16, left side wall 18, top wall 20 and bottom 22, is flat or planar and has a right side edge attached to the right side wall 16, a left side edge spaced inwardly from the left side wall 18 in the left to right direction perpendicular to the right and left side walls 16 and 18 of the enclosure, an upper edge adjacent the top wall 20 and a lower edge close to the top surface of the floor pan 44. The interior wall 66 is parallel to the front and rear walls 12 and 14, and is perpendicular to the right and left side walls 16 and 18, the top wall 20, and the top surface of the floor pan 44. The right and left side edges of the interior wall 66 are formed respectively by vertical wires of the wire mesh material 26, and the upper and lower edges of the interior wall 66 are formed respectively by horizontal wires of the wire mesh material 26. The distance that the interior wall 66 is spaced rearwardly from the front wall 12 is preferably in the range of 7 to 9 inches. The distance that the interior wall 66 extends inwardly from the right side wall 16 toward the left side wall 18, i.e. the width of the interior wall 66 from its right side edge to its left side edge, is greater than the width of the entry opening 32. In other words, the interior wall 66 extends toward the left beyond the entry opening 32, such that the distance from the left side edge of the interior wall 66 to the left side wall 18 is less than the distance from the left side of the entry opening 32 to the left side wall 18. The width of the interior wall 66 is preferably in the range of 12 to 17 inches, and the distance that the left side edge of the interior wall 66 extends beyond the left side of the entry opening 32 is preferably 3 inches or greater. The circuitous path 68 created by the interior wall 66 requires that a cat entering the enclosure 10 through the entry opening 32 while facing toward the rear of the enclosure must make a sharp or right angle turn toward the left in order to follow the circuitous path 68 around the interior wall 66 to access the bowls 58a and 58b. The width of the circuitous path 68 provides sufficient room for the rearward facing cat to execute the sharp turn toward the left from the entry opening 32 and continue walking toward the left along the circuitous path 68. The distance that the left side edge of the interior wall 66 is spaced inwardly from the left side wall 18 is selected so that the cat, now facing toward the left side of the enclosure after making the sharp turn toward the left from the entry opening 32, must make a sharp or right angle turn toward the rear of the enclosure 10 in order to pass by the interior wall 66. The width of the circuitous path 68 provides sufficient room for the left facing cat to execute the sharp turn toward the rear and continue walking toward the rear along the circuitous path 68. The distance that the interior wall 66 is spaced forwardly of the feeding tray 56 is selected so that the cat, now facing rearwardly after making the sharp turn toward the rear to pass by the interior wall 66, must make a sharp or right angle turn toward the right of the enclosure to pass behind the interior wall 66 and access the bowls 58a and 58b. The width of the circuitous path 68 provides sufficient room for the rearward facing cat to execute the sharp turn toward the right and continue walking toward the bowls 58a and 58b. Once the cat has turned toward the right and moved to the rear of the interior wall 66, the cat will normally instinctively turn from facing the right to facing the rear so as to face the bowls 58a and 58b, thereby inherently imparting another sharp or right angle turn to the circuitous path 68. The distance that the interior wall 66 is spaced forwardly from the feeding tray 56 provides adequate room for the cat to comfortably drink water and eat food from the bowls 58a and 58b, and the section of the circuitous path 68 to the rear of the interior wall 66 may be considered a feeding area within the enclosure 10. Accordingly, the circuitous path 68 that leads from the entry opening 32 to the bowls 58a and 58b within enclosure 10 has a pattern that includes a plurality of sharp or right angle turns in a plurality of different directions. The circuitous path 68 is an example of one whose pattern has three sharp or right angle turns in three different directions, i.e. a first sharp or right angle turn from the entry opening 32 to the left of the enclosure (first direction), a second sharp or right angle turn from the left toward the rear of the enclosure (second direction), and a third sharp or right angle turn from the rear toward the right of the enclosure (third direction). In addition, the second and third turns are in effect separated only by the interior wall 66, such that the third turn immediately follows the second turn and creates a "u" shaped turn or bend along the circuitous path 68. Moreover, the circuitous path 68 may be considered as having an inherent fourth sharp or right angle turn from the right toward the rear. It should be appreciated that the pattern of the circuitous path 68 within the enclosure can vary and can include a plurality of sharp turns that are greater than or less than a right angle, and that the turns can be in various different directions. When the cat has finished drinking water and/or eating food from the bowls 58a and 58b, the cat will turn around and follow the circuitous path 68 in reverse to exit the enclosure 10 through the entry opening 32.

The cat feeding enclosure 10 is an example of one in which the entry opening 32 and interior wall 66 are located on or toward the right side of the enclosure. It should be appreciated that the positions of the entry opening 32 and interior wall 66 can be reversed from that shown in the drawings, so that the entry opening 32 and interior wall 66 are disposed on or toward the left side of the enclosure 10. Accordingly, the circuitous path 68 will also be reversed such that the first sharp or right angle turn will be toward the right, the second sharp or right angle turn will be from the right toward the rear, and the third sharp or right angle turn will be from the rear toward the left. The inherent fourth sharp or right angle turn would be from the left toward the rear.

The cat feeding enclosure 10 allows a cat to freely access water and food placed in bowls 58a and 58b. The cat feeding enclosure 10 appeals to a cat's natural desire for play, its instinctive curiosity, and its natural inclination to enter and explore confined or enclosed spaces. The cat feeding enclosure 10 appeals especially to a cat's natural inclination to explore circuitous and maze-like paths or tunnels. The size and shape of the entry opening 32 and the pattern and width of the circuitous path 68 within the enclosure 10 make it easy, comfortable and enjoyable for a cat to access the water and food bowls 58a and 58b within the enclosure 10 via the entry opening 32 and the circuitous path 68. In addition, the enclosure 10 provides a cat with a space in which the cat can feel safe, protected and secure. Optionally, a replaceable layer of material can be placed over the top surface of the floor pan 44 along all or part of the circuitous path 68, and the layer can be made of a material, such as carpet or sisal, that cats naturally enjoy scratching. In addition, catnip and various toys can be placed in the enclosure 10 and can be attached to or suspended from the walls of the enclosure 10. In the unlikely event that a cat initially seems reluctant to enter the cat feeding enclosure, items such as catnip and toys can be used as training aids to entice a cat to enter the enclosure. Although the cat feeding enclosure 10 is particularly advantageous for use in preventing a dog from accessing the bowls 58a and 58b within the enclosure as explained below, the added stimulation, entertainment and enjoyment that the enclosure provides to a cat make it advantageous and useful even in households that maintain cats without also maintaining dogs.

The cat feeding enclosure 10 provides several aspects of deterrence or prevention to prevent a dog from entering the enclosure and accessing the bowls 58a and 58b within the enclosure. A majority of dogs, including dogs of average size and larger, will be too large to fit through the entry opening 32 and they will be prevented from accessing the bowls 58a and 58b by virtue of their size. In addition, dogs are by nature generally disinclined to enter confined, narrow and enclosed spaces, and especially circuitous or maze-like paths or tunnels. Consequently, the circuitous path 68 serves as a deterrent or preventative to keep a dog, even one that can fit through the entry opening 32, from attempting to access the feeding area within the enclosure 10. Furthermore, the plurality of sharp turns along the circuitous path 68 are generally too difficult or discomfiting for a dog, who is anatomically less agile, less flexible, and larger than a cat, to execute or maneuver thusly providing a further deterrent or preventative effect.

EXAMPLE

The efficacy of the cat feeding enclosure was tested using a 16 year old Himalayan cat and two Golden Retrievers, 5 and 7 years old, respectively, as test subjects. Prior to the test, the cat had been receiving cat food from a food bowl placed upon the counter of a bathroom vanity to keep it beyond the reach of the dogs. With advancing age, it had become routine for the cat to meow in order to be picked up and placed upon the counter. The test was performed using a cat feeding enclosure approximately 29.5 inches long×17 inches wide×20 inches high placed on the floor of a room freely accessible to the cat and dogs. The long walls of the enclosure served as the front and rear walls while the short walls of the enclosure served as the right and left side walls. An entry opening 10 inches wide×12.6 inches high was provided in the front wall toward the right side of the enclosure. The right side of the entry opening was located about 2 inches to the left of the right edge of the front wall that was contiguous with the front edge of the right side wall. The interior wall was spaced about 7 inches rearwardly from the entry opening. The interior wall extended from the right side wall toward the left about 17 inches, such that the left side edge of the interior wall was disposed about 5 inches toward the left beyond the left side of the entry opening. The bowl with cat food therein was positioned to the rear of the interior wall and adjacent the right side wall of the enclosure. The cat immediately approached the entry opening and within minutes the cat entered the enclosure through the entry opening and followed the circuitous path to the food bowl. As the cat consumed food from the food bowl, the dogs observed from a distant position external of the cat feeding enclosure. After the cat stopped eating, it remained in the enclosure for some time grooming itself. The cat eventually exited the enclosure through the entry opening. Within the next 24 hours, the cat was observed entering the enclosure several times at will to access food within the food bowl, and was observed napping within the enclosure. The enclosure continued to be effective during this period in preventing the dogs from accessing the cat's food bowl.

The cat feeding enclosure 10 is preferably designed to be collapsible to obtain a collapsed condition in which the front wall 12, rear wall 14, right side wall 16, left side wall 18, top wall 20, and interior wall 66 lie flat or substantially flat in close overlapping arrangement upon the floor pan 44 and bottom 20. The enclosure 10 can be designed in various ways to be collapsible from the assembled condition and to be restored to the assembled condition from the collapsed condition. In the enclosure 10, strategically located pivotal or hinged connectors are used to attach the walls 12, 14, 16, 18, 20 and 66 and allow relative pivotal movement between walls to obtain the assembled and collapsed conditions. The pivotal connectors may be the same as or similar to the pivotal connectors 48, although it should be appreciated that various types of pivotal or hinged connectors could be used. In the enclosure 10, one or more pivotal connectors 48 (preferably two appropriately spaced or located connectors 148) are used to connect the horizontal wire that forms the lower edge of front wall 12 to the horizontal wire that forms the upper edge of the front peripheral wall segment 34. The front wall 12 is thusly capable of being pivoted or rotated relative to the front peripheral wall segment 34 about a horizontal pivot axis through the connectors 148 at the lower edge of the front wall 12. One or more pivotal connectors 48 (preferably two appropriately spaced or located connectors 248) are used to connect the horizontal wire that forms the lower edge of rear wall 14 to the horizontal wire that forms the upper edge of the rear peripheral wall segment 36. The rear wall 14 is thusly capable of being pivoted or rotated relative to the rear peripheral wall segment 36 about a horizontal pivot axis through the connectors 248 at the lower edge of the rear wall 14, the pivot axis through connectors 248 being parallel to the pivot axis through connectors 148. One or more pivotal connectors 48 (preferably two appropriately spaced or located connectors 348) are used to connect the horizontal wire that forms the lower edge of the right side wall 16 to the horizontal wire that forms the upper edge of the right peripheral wall segment 38. Accordingly, the right side wall 16 is capable of being pivoted or rotated relative to the right peripheral wall segment 38 about a horizontal pivot axis through the connectors 348 at the lower edge of the right side wall 16, the pivot axis through connectors 348 being perpendicular to the pivot axes through connectors 148 and 248. One or more connectors 48 (preferably two appropriately spaced or located connectors 448) are used to connect the horizontal wire that forms the lower edge of the left side wall 18 to the horizontal wire that forms the upper edge of the left peripheral wall segment 40. The left side wall 18 is thusly capable of being pivoted or rotated relative to the left peripheral wall segment 40 about a horizontal pivot axis through the connectors 448 at the lower edge of the left side wall 18, the pivot axis through connectors 448 being parallel to the pivot axis through connectors 348. One or more pivotal connectors 48 (preferably two appropriately spaced or located connectors 548) are used to connect the horizontal wire that forms the right peripheral edge of top wall 20 to the horizontal wire that forms the upper edge of right side wall 16. The right side wall 16 and top wall 20 are thusly capable of pivoting or rotating relative to one another about a horizontal pivot axis through the connectors 548, the pivot axis through connectors 548 being parallel to the pivot axis through connectors 448. One or more pivotal connectors 48 (preferably two appropriately spaced or located connectors 648) are used to connect the horizontal wire that forms the left peripheral edge of top wall 20 to the horizontal wire that forms the upper edge of the left side wall 18. The top wall 20 and left side wall 18 are thusly capable of pivoting or rotating relative to one another about a horizontal pivot axis through the connectors 648, the pivot axis through connectors 648 being parallel to the pivot axis through connectors 548. One or more pivotal connectors 48 (preferably two appropriately spaced of located connectors 748) are used to connect the vertical wire that forms the right side edge of the interior wall 66 to an intermediate vertical wire of the right side wall 16. Accordingly, the interior wall 66 is capable of being pivoted or rotated relative to the right side wall 16 about a vertical pivot axis through the connectors 748 at the right side edge of the interior wall 66, the vertical pivot axis through the connectors 748 being perpendicular to the horizontal pivot axes through connectors 148, 248, 348, 448, 548 and 648.

Figure 5:
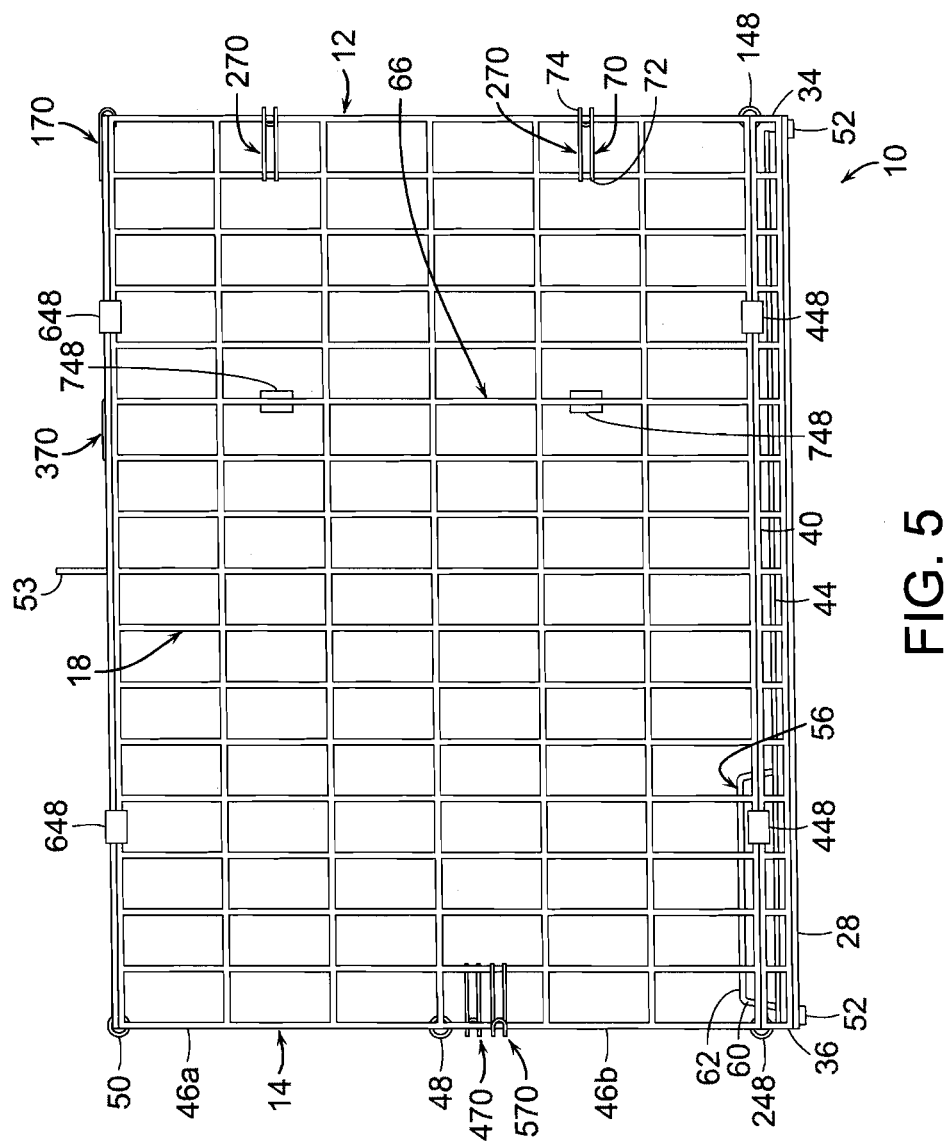
FIG. 5 is a left side view of the cat feeding enclosure.
Figure 6:
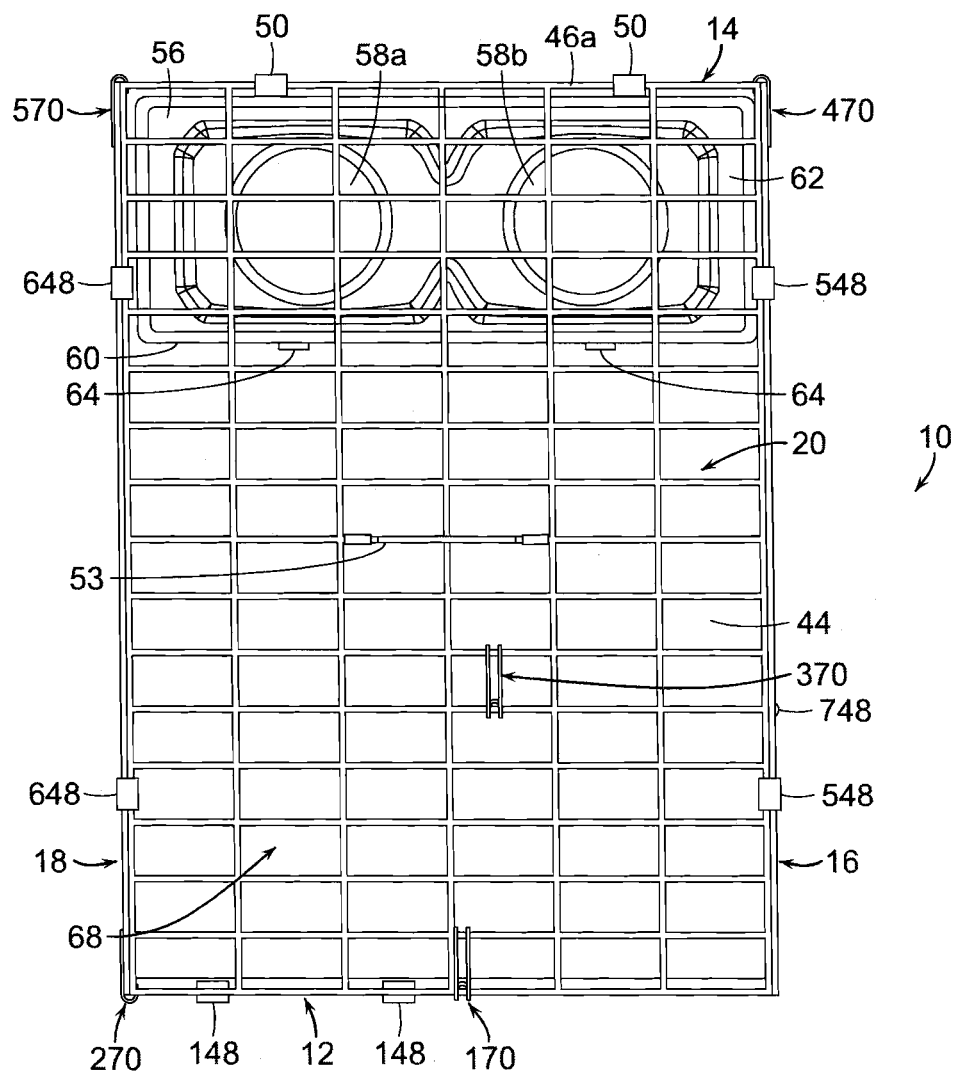
FIG. 6 is a top view of the cat feeding enclosure.
Figure 7:
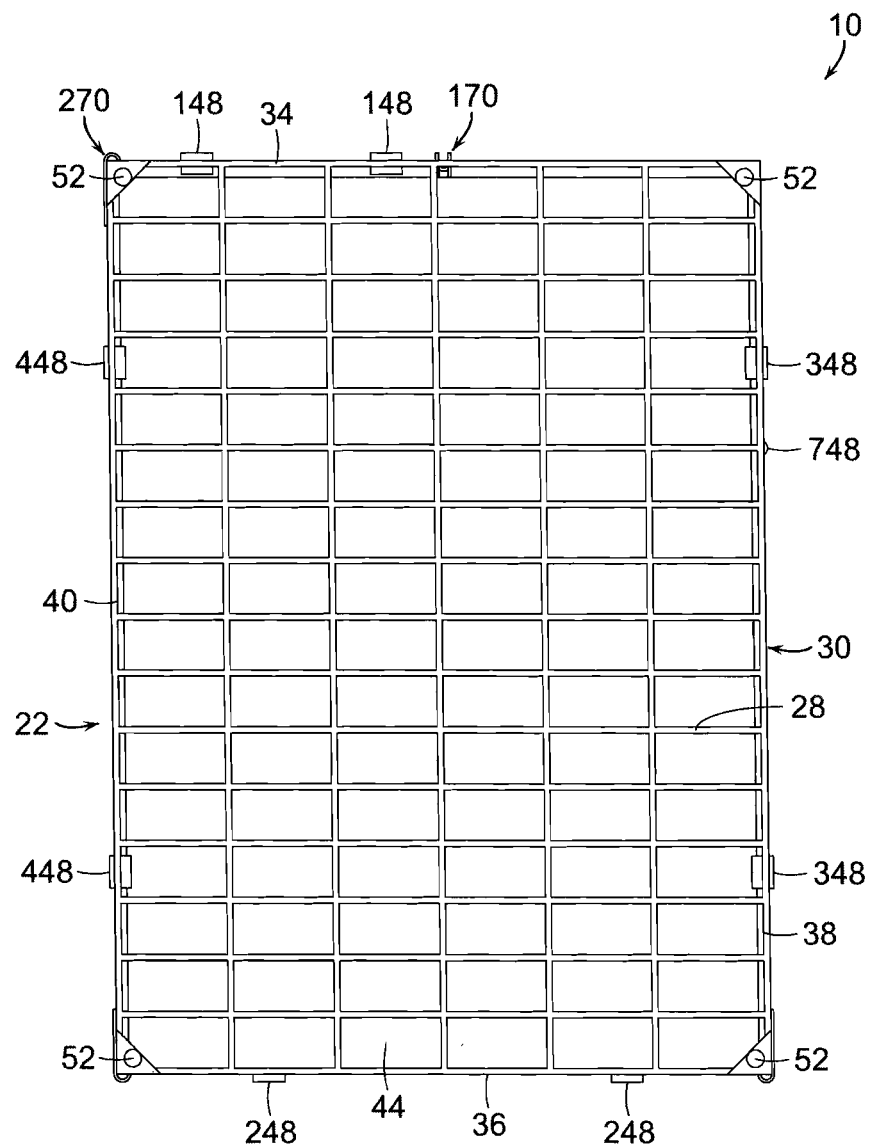
FIG. 7 is a bottom view of the cat feeding enclosure.

A plurality of clips 70 are employed in the enclosure 10 to releasably secure the pivotal walls of the enclosure 10 in the assembled condition. As seen in FIG. 5, each clip 70 has a longitudinally extending clip body, with one end 72 of the clip body designed for removable or permanent attachment to an individual or single wire of the wire mesh material 26 and an opposite end of the clip body shaped in a hook formation 74 designed for releasable engagement with a pair of contiguous wires of the wire mesh material 26 that are parallel to the individual wire that is attached to end 72. The length of the clip body is such that the end 72 and hook formation 74 are appropriately spaced from one another for the hook formation 74 to be engaged with a pair of contiguous wires in which one wire of the pair is next adjacent in the grid pattern of material 26 to the individual wire that is attached to end 72. A hook formation 74 engaged with a pair of contiguous wires serves to hold or secure the pair of wires in contiguous relation and prevents the pair of contiguous wires from separating. The ends 72 of the clips 70 can be attached to individual wires of the wire mesh material 26 in various ways, such as being welded to the individual wires. The use of a permanent attachment for the ends 72 of the clips 70 simplifies assembly of the enclosure 10 for the purchaser or end user. The clips 70 can be deformable, resilient or flexible to allow the hook formations 74 to be snapped on and off of a pair of contiguous wires and/or the wire mesh material 26 can bend, deform or flex to some degree to facilitate engagement of the wires with the hook formations 74.

In the enclosure 10, one or more clips 70 (preferably a single appropriately located clip 170) connects the horizontal wire that forms the upper edge of front wall 12 to the horizontal wire that forms the front peripheral edge of top wall 20. The hook formation 74 for clip 170 is releasably engaged with the wire that forms the upper edge of front wall 12 and the wire that forms the front peripheral edge of top wall 20 and holds these wires in contiguous relation while the end 72 of clip 170 is attached to the wire of the wire mesh material 26 of the top wall 20 that is next adjacent and parallel to the wire that forms the front peripheral edge of the top wall 20. One or more clips 70 (preferably two appropriately spaced or located clips 270) connect the left edge of front wall 12 to the front edge of left side wall 18. The hook formations 74 for clips 270 are releasably engaged with the vertical wire that forms the left edge of front wall 12 and the vertical wire that forms the front edge of left side wall 18 and hold these wires in contiguous relation while the ends 72 of clips 270 are attached to the wire of the wire mesh material 26 of the left side wall 18 that is next adjacent and parallel to the wire that forms the front edge of the left side wall 18. One or more clips 70 (preferably one appropriately located clip 370) connects the upper edge of the interior wall 66 to the top wall 20. The hook formation 74 for clip 370 is releasably engaged with the horizontal wire that forms the upper edge of the interior wall 66 and an intermediate horizontal wire of the wire mesh material 26 of the top wall 20 that is contiguous to the upper edge of interior wall 66 and holds these wires in contiguous relation while the end 72 of clip 370 is attached to the wire of the wire mesh material 26 of the top wall 20 that is next adjacent and parallel to the intermediate wire that is held in contiguous relation with the upper edge of interior wall 66. One or more clips 70 (preferably one appropriately located clip 470) connects the right edge of the lower rear wall segment 46b to the rear edge of the right side wall 16. The hook formation 74 for dip 470 is releasably engaged with the vertical wire that forms the right edge of the lower rear wall segment 46b and the vertical wire that forms the rear edge of right side wall 16 and holds these wires in contiguous relation while the end 72 of clip 470 is attached to the wire of wire mesh material 26 of the right side wall 16 that is next adjacent and parallel to the wire that forms the rear edge of the right side wall 16. One or more clips 70 (preferably one appropriately located clip 570) connects the left edge of the lower rear wall segment 46b to the rear edge of the left side wall 18. The hook formation 74 for clip 570 is releasably engaged with the vertical wire that forms the left edge of the lower rear wall segment 46b and the vertical wire that forms the rear edge of the left side wall 18 and holds these wires in contiguous relation while the end 72 of clip 570 is attached to the wire of wire mesh material 26 of the left side wall 18 that is next adjacent and parallel to the wire that forms the rear edge of the left side wall 18. When it is desired to release the enclosure 10 for movement from the assembled condition to the collapsed condition, the hook formations 74 of the clips are released from the contiguous wires held thereby. When the contiguous wires are released from the hook formations 74, the pivotal walls of the enclosure 10 are released for pivotal movement about the pivot axes through the pivotal connectors 48.

Prior to moving the enclosure 10 from the assembled condition to the collapsed condition, the rear wall 14 is moved to the open position to expose the access opening, and the bowls 58a and 58b and the feeding tray 56 are removed from the enclosure via the access opening. The rear wall 14 may then be returned to its closed position. Clip 370 is disengaged, and the interior wall 66 is rotated or pivoted relative to the right side wall 16 and about the vertical pivot axis through the pivotal connectors 748, the interior wall 66 being pivoted or rotated toward the rear of the enclosure 10 to lay flat or essentially flat against the right side wall 16. The interior wall 66 may be pivoted manually by inserting a hand through the access opening while the rear wall 14 is in the open position or by inserting a hand through the entry opening 32. Clips 170 and 270 are disengaged, and the front wall 12 is pivoted or rotated relative to the front peripheral wall segment 34 and about the horizontal pivot axis through the pivotal connectors 148. The front wall 12 is rotated toward the rear and downwardly to lay flat or essentially flat face up over the floor pan 44. Latch elements 50 and clips 470 and 570 are disengaged, and the rear wall 14 is rotated or pivoted relative to the rear peripheral wall segment 36 and about the horizontal pivot axis through the pivotal connectors 248. The upper and lower rear wall segments 46a and 46b are rotated toward the front of the enclosure 10 and downwardly, as a unit, until the rear wall 14 lays flat or substantially flat face up on top of the floor pan 44. The left side wall 18 is pivoted outwardly toward the left and downwardly relative to the left peripheral wall segment 40 and about the horizontal pivot axis through the pivotal connectors 448 until the left side wall 18 lays flat or essentially flat face down alongside the bottom 22 of the enclosure. As the left side wall 18 is pivoted, the top wall 20 and right side wall 16 pivot therewith such that the right side wall 16 lays flat or essentially flat face up on top of the front and rear walls and floor pan, and the top wall 20 lays flat or substantially flat face up on top of the left side wall 18. The top wall 20 is then pivoted or rotated upwardly and toward the right about the horizontal pivot axis through connectors 548 until the top wall 20 is inverted and lays flat or substantially flat face down on top of the right side wall 16. As the top wall 20 is rotated, the left side wall 18 pivots or rotates therewith such that it lays flat or substantially flat face up on top of the top wall 20. Consequently, the walls 12, 14, 16, 18, 20, and 66 of the enclosure lay in close overlapping arrangement within the footprint of the bottom 22, and the collapsed enclosure is of minimal height or thickness. The feeding tray 56 with the bowls 58a and 58b received therein can be placed on top of the collapsed enclosure 10. The collapsed enclosure 10 can be stored flat in a horizontal position, with or without the feeding tray and bowls thereon, or the collapsed enclosure 10 can be stored on its side or end in an upright or vertical position. The ability for the enclosure 10 to collapse facilitates packing for storage and shipment, minimizes the amount of space taken up by the product in a warehouse or retail setting, and reduces the amount of space taken up by the product in a residential setting when not in use. The collapsed enclosure 10 can be returned to its assembled condition by reversing the steps of the collapsing sequence and reengaging the clips and latch elements.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A cat feeding enclosure, comprising
a plurality of exterior walls each made of wire mesh material enclosing an interior space, said plurality of exterior walls including a horizontal bottom wall and a vertical front wall;
entry opening along said front wall providing communication with said interior space from the area external to said enclosure, said entry opening having a width in the horizontal direction and a height in the vertical direction, said entry opening being no larger than necessary in width and height for domestic cats of various sizes to enter and exit said enclosure through said entry opening;
a feeding area within said interior space for accommodating a receptacle for holding cat food supported on said bottom wall; and
a vertical interior wall made of wire mesh material within said interior space, said interior wall being located between said entry opening and said feeding area, said interior wall being spaced inwardly from said entry opening in alignment therewith and creating a circuitous path along said bottom wall leading from said entry opening to said feeding area so that a cat walking along said bottom wall is forced to follow in order to access said feeding area from said entry opening, said circuitous path including a plurality of sharp turns to deter a dog from following said circuitous path to access said feeding area from said entry opening.

2. The cat feeding enclosure recited in claim 1 wherein said front wall is planar and perpendicular to said bottom wall, and said interior wall is planar and parallel to said front wall.

3. The cat feeding enclosure recited in claim 2 wherein said entry opening has a height in the range of 12-18 inches and a width in the range of 9-10 inches.

4. The cat feeding enclosure recited in claim 3 wherein said interior wall is spaced in from said front wall a distance in the range of 7-9 inches.

5. The cat feeding enclosure recited in claim 4 and further including a floor pan removably disposed over said bottom wall and providing a walking surface for a cat to walk along said bottom wall.

6. The cat feeding enclosure recited in claim 5 wherein said plurality of exterior walls further includes a top wall, and said interior wall has a height to fit closely between said floor pan and said to wall.

7. The cat feeding enclosure recited in claim 5 and further including a feeding tray to fit within said feeding area upon said floor pan, said feeding tray having recesses for respectively supporting a receptacle for holding cat food and a receptacle for holding water.

8. The cat feeding enclosure recited in claim 1 wherein said plurality of exterior walls define a right angle parallelepiped configuration in an assembled condition for said enclosure wherein said exterior walls enclose said interior space, and said enclosure is selectively movable to a collapsed condition wherein said exterior walls and said interior wall are in close overlapping arrangement with one another.

9. The cat feeding enclosure recited in claim 1 wherein said plurality of sharp turns includes three right angle turns in three different directions.

10. A cat feeding enclosure, comprising
a plurality of exterior walls each made of wire mesh material enclosing an interior space, said plurality of exterior walls including a horizontal bottom wall to support a cat for walking along said bottom wall, a top wall, a vertical front wall, a vertical rear wall, and opposite vertical side walls connecting said top wall to said bottom wall;
an entry opening along said front wall providing communication with said interior space from the area external to said enclosure, said entry opening being located adjacent one of said side walls, said entry opening having a width in the horizontal direction between said side walls and a height in the vertical direction between said top wall and said bottom wall, said entry opening being no larger than necessary in width and height for domestic cats of various sizes to enter and exit said enclosure through said entry opening; and
a vertical interior wall made of wire mesh material within said interior space, said interior wall being spaced rearwardly from said entry opening in alignment therewith and being spaced forwardly of said rear wall to define a feeding area within said interior space between said interior wall and said rear wall for accommodating a receptacle for holding cat food supported on said bottom wall, said interior wall having a width extending in the same direction as said width of said entry opening and of sufficient size to create a circuitous path along said bottom wall leading from said entry opening to said feeding area so that a cat walking along said bottom wall is forced to follow in order to access said feeding area from said entry opening, said circuitous path including a plurality of sharp turns in a plurality of different directions to deter a dog from following said circuitous path to access said feeding area, said plurality of sharp turns including a first sharp turn toward said side wall that is opposite said one of said side walls and a second sharp turn toward said rear wall.

11. The cat feeding enclosure recited in claim 10 wherein said plurality of sharp turns further includes a third sharp turn toward said one of said side walls.

12. The cat feeding enclosure recited in claim 10 wherein said width of said entry opening extends from adjacent said one of said side walls toward said side wall that is opposite said one of said side walls, said width of said interior wall extends from adjacent said one of side walls toward said side wall that is opposite said one of said side walls, and said width of said interior wall is greater than said width of said entry opening such that said interior wall is spaced from said side wall that is opposite said one of said side walls a distance less than the distance that said entry opening is spaced from said side wall that is opposite said one of said side walls.

13. The cat feeding enclosure recited in claim 10 and further including a selectively operable and closable access door in one of said exterior walls to provide communication with said feeding area for removal and replacement of the receptacle.

14. A cat feeding enclosure, comprising
a plurality of exterior walls each made of wire mesh material enclosing an interior space, said plurality of exterior walls including a horizontal bottom wall to support a cat for walking along said bottom wall, a top wall, and a vertical front wall, a vertical rear wall, a vertical right side wall and a vertical left side wall connecting said top wall to said bottom wall;
an entry opening along said front wall providing communication with said interior space from the area external to said enclosure, said entry opening having a width in the horizontal direction between said side walls and a height in the vertical direction between said bottom wall and said top wall, said entry opening being no larger than necessary in width and height for domestic cats of various sizes to enter and exit said enclosure through said entry opening, said entry opening being located adjacent one of said side walls with said width of said entry opening extending toward the opposite one of said side walls; and a vertical interior wall made of wire mesh material within said interior space, said interior wall being spaced rearwardly from said entry opening in alignment therewith and being spaced forwardly of said rear wall to define a feeding area within said interior space between said interior wall and said rear wall for accommodating a receptacle for holding cat food supported on said bottom wall, said interior wall having a height to fit between said bottom wall and said top wall and having a width extending in the same direction as said width of said entry opening, said interior wall being disposed in said enclosure adjacent said one of said side walls with said width of said interior wall extending toward said opposite one of said side walls beyond said width of said entry opening, said interior wall creating a circuitous path along said bottom wall leading from said entry opening to said feeding area so that a cat walking along said bottom wall is forced to follow in order to access said feeding area from said entry opening, said circuitous path including a plurality of sharp turns with each of said turns being in a different direction to deter a dog from following said circuitous path to access said feeding area.

15. The cat feeding enclosure recited in claim 14, said bottom wall, said top wall, said front wall, said rear wall, said right side wall, and said left side wall are planar, and said enclosure has a right angle parallelepiped external configuration in an assembled condition for said enclosure wherein said exterior walls enclose said interior space.

16. The cat feeding enclosure recited in claim 15 wherein said enclosure includes a bottom comprised of said bottom wall and a vertical peripheral wall extending along the periphery of said bottom wall, said peripheral wall and said bottom wall defining a depression, and said enclosure further includes a floor pan removably disposed within said depression with a close fit, said floor pan having a top surface forming a walking surface for a cat to walk along said bottom wall.

17. The cat feeding enclosure recited in claim 16 wherein said rear wall includes a lower rear wall segment and an upper rear wall segment pivotally attached to said lower rear wall segment for movement between a closed position wherein said upper rear wall segment and said lower rear wall segment are at least substantially co-planar and an open position wherein said upper rear wall segment is pivoted outwardly relative to said lower rear wall segment to provide an access opening in communication with said feeding area, and further including a latch on said enclosure for releasably securing said upper rear wall segment in said closed position.

18. The cat feeding enclosure recited in claim 17 wherein said peripheral wall has an upper edge and said front wall, said rear wall, said right side wall and said left side wall have lower edges, respectively, said enclosure further includes a plurality of pivotal connectors pivotally attaching said lower edges to said upper edge of said peripheral wall, said interior wall has a side edge and said enclosure further includes at least one pivotal connector pivotally attaching said side edge of said interior wall to said one of said side walls, wherein said front wall, said rear wall, said right side wall and said left side wall have upper edges, respectively, said top wall has front, rear, right and left peripheral edges, said enclosure further includes a plurality of pivotal connectors pivotally attaching said upper edges of said right side wall and said left side wall respectively to said right and left peripheral edges of said top wall, a plurality of clips releasably securing said upper edges of said front wall, said right side wall and said left side wall respectively to said front, right and left peripheral edges of said top wall, wherein said latch releasably secures said upper edge of said rear wall to said rear peripheral edge of said top wall, said interior wall has an upper edge, and said enclosure further includes at least one clip releasably securing said upper edge of said interior wall to said top wall, said interior wall being pivotal relative to said one of said side walls, and said front wall, said rear wall, said right side wall and said left side wall are pivotal relative to said bottom wall and said top wall when said clips are released to obtain a collapsed condition for said enclosure wherein said interior wall and said front wall, said rear wall, said right side wall, said left side wall and said top wall lay in close overlapping arrangement on top of said bottom wall.

19. The cat feeding enclosure recited in claim 18 wherein said enclosure further includes at least one clip releasably securing said front wall to said left side wall, at least one clip releasably securing said rear well to said left side wall, and at least one clip releasably securing said rear wall to said right side wall.

20. The cat feeding enclosure recited in claim 17 and further including a feeding tray for being removably disposed within said feeding area upon said floor pan, said feeding tray including recesses for respectively receiving a receptacle for holding cat food and a receptacle for holding water, said feeding tray being insertable in and removable from said enclosure through said access opening that is provided when said upper rear wall segment is in said open position, and further including one or more locking elements releasably securing said feeding tray to said floor pan.

* * * * *